United States Patent
Mayahara et al.

[11] Patent Number: 6,106,945
[45] Date of Patent: Aug. 22, 2000

[54] REINFORCING MATERIAL FOR KNEADED AND FORMED HYDRAULIC MATERIAL, AND KNEADED AND FORMED ARTICLE

[75] Inventors: Mitsuo Mayahara; Hisashi Suemori; Toshiaki Ikimine; Jun-ichi Hikasa; Tadashi Saito; Atsuhisa Ogawa; Akio Ohmory; Masahiro Satoh, all of Okayama-Pref., Japan

[73] Assignee: Kuraray Co., Ltd., Kurashiki, Japan

[21] Appl. No.: 09/290,171

[22] Filed: Apr. 13, 1999

[30] Foreign Application Priority Data

Apr. 13, 1998 [JP] Japan ................................. 10-100746
Jun. 4, 1998 [JP] Japan ................................. 10-155707

[51] Int. Cl.$^7$ ................................................. D02G 3/00
[52] U.S. Cl. ........................... 428/397; 428/357; 428/400; 428/401
[58] Field of Search ................................... 428/357, 397, 428/400, 401

[56] References Cited

FOREIGN PATENT DOCUMENTS

| 0 220 649 | 5/1987 | European Pat. Off. . |
| 0 271 825 | 6/1988 | European Pat. Off. . |
| 0 286 112 | 10/1988 | European Pat. Off. . |
| 0 313 068 | 4/1989 | European Pat. Off. . |
| 0 535 373 | 4/1993 | European Pat. Off. . |
| 54-31421 | 3/1979 | Japan . |
| 56-125269 | 10/1981 | Japan . |
| 59-8664 | 1/1984 | Japan . |
| 63-303837 | 12/1988 | Japan . |

*Primary Examiner*—Richard Weisberger
*Attorney, Agent, or Firm*—Oblon, Spivak, McClelland, Maier & Neustadt, P.C.

[57] ABSTRACT

A reinforcing material for incorporation into a kneaded and shaped hydraulic material, comprising a fiber having a fineness of 5 d or more, an aspect ratio of from 10–500, a breaking tenacity of 5 g/d or more, an elongation (A) of from 6–20%, a flexing tenacity utilization factor (B) of 35% or more, and (B)≦4 (A).

18 Claims, 1 Drawing Sheet

REINFORCING MATERIAL FOR KNEADED AND FORMED HYDRAULIC MATERIAL, AND KNEADED AND FORMED ARTICLE

BACKGROUND OF THE INVENTION

1. Field of the Invention

The present invention relates to a reinforcing material for a kneaded and formed hydraulic material, and a kneaded and formed article.

2. Description of the Background

Fiber has been used as a reinforcing material for a hydraulic material, such as cement and gypsum, for a some time.

For example, JP 54-31421 discloses a fiber-reinforced paper-manufactured cement plate mixed with polyvinyl alcohol based fiber having a fineness of from 15–25 d, a strength of 9 g/d or more, and an elongation of from 5–10%. In the case where a paper-manufacturing method is employed, in which a slurry comprising fiber and a hydraulic material dispersed in water is paper-manufactured, the fiber is two-dimensionally oriented in the direction of extension of the article which is formed, to effectively exhibit the reinforcing effect. However, in the case where a kneading and forming method is employed, in which the fiber is uniformly blended in a matrix, since the fiber is three-dimensionally and randomly dispersed in the cement, it is difficult for the fiber to exert a sufficient and practical reinforcing effect in the attempt to prepare a kneaded and formed article having a high toughness.

JP 56-125269 discloses a paper-manufactured cement plate and a kneaded and formed article therefrom using PVA based fiber having a fineness of from 1–4 d, a strength of from 8–9 g/d, and an elongation of from 5–6%. Although a formed paper-manufactured article prepared by this method exhibits excellent performance characteristics, when the procedure of kneading and forming is conducted, problems such as the formation of fiber balls occurs because of the small diameter of the fibers. The result is that a sufficient reinforcing effect cannot be obtained.

JP 59-8664 discloses a hardened hydraulic article obtained by kneading and forming a PVA based fiber having a fineness of from 100–1,000 d and an aspect ratio of from 30–150 in a matrix material. Further, JP 63-303837 describes a hardened hydraulic article obtained by kneading and forming a matrix material containing PVA based fibers having a fineness of from 1,000–9,000 d and an aspect ratio of from 20–150. The fiber of the product has a high tenacity and a high modulus of elasticity. However, when a fiber having only a high tenacity and a high modulus of elasticity is used to prepare an article, or the adhesion of the fiber to the matrix is increased, the toughness of the kneaded and formed article cannot be sufficiently be improved, because when a bending stress is applied to the kneaded and formed article, the PVA fiber has a tendency to break before it is able to exhibit its inherent strength.

SUMMARY OF THE INVENTION

Accordingly, one object of the present invention is to provide a reinforcing material for a kneaded and formed hydraulic material, and a kneaded and formed product obtained therefrom, which fibers exhibit a considerably improved and uniform dispersibility and reinforcing effect.

Another object of present invention is to provide a kneaded and formed article which is not only capable of delaying the formation of the first crack in the hardened product prepared, but which also exhibits a high stress even after the formation of the first crack in a product.

Briefly, these objects and other objects of the present invention as hereinafter will become more readily apparent can be attained by a reinforcing material for a kneaded and formed hydraulic material comprising fibers having a fineness of 5 d or more, an aspect ratio of from 10–500, a breaking tenacity of 5 g/d or more, an elongation (A) of from 6–20%, a flexing tenacity utilization factor (B) of 35% or more, and $(B) \geq 4(A)$.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
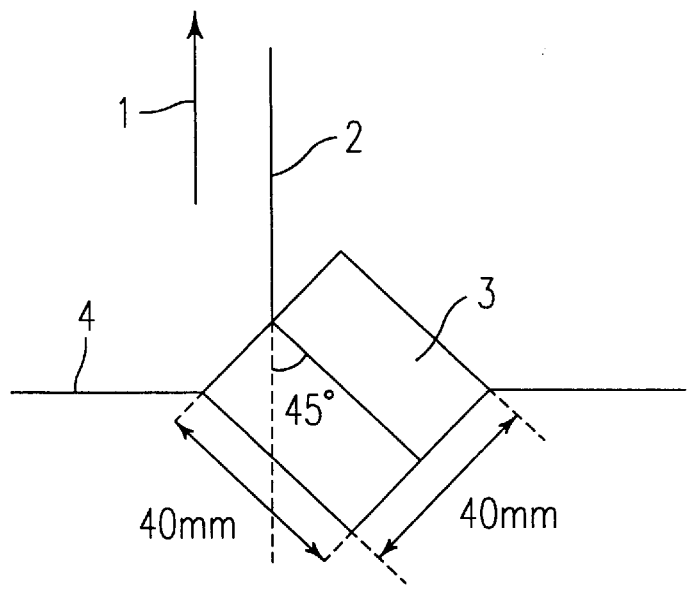
FIG. 1 is a schematic diagram showing the form of a shaped hydraulic article used in the measurement of the flexing tenacity utilization factor, and the direction of the applied tensile force.
Figure 2:
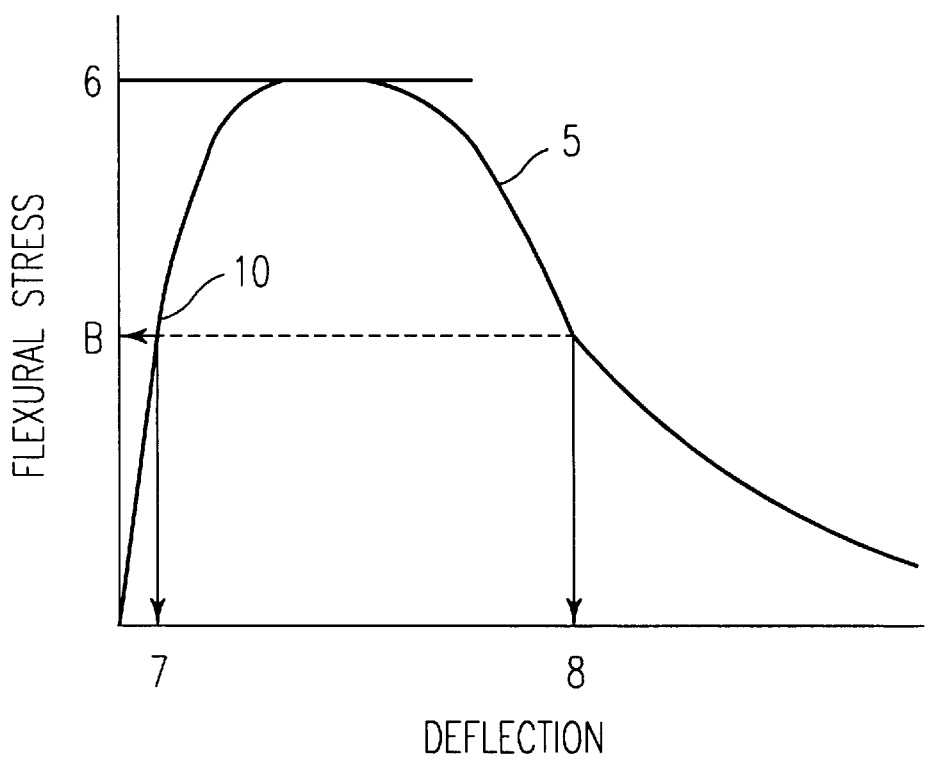
FIG. 2 is a graph showing an example of a deflection-flexural load curve of an article prepared from kneaded and shaped reinforced material.

When a hydraulic material is kneaded and formed, the fiber reinforcing material incorporated in the matrix material is three-dimensionally and randomly dispersed in the matrix. When a bending stress is applied to the formed article, although the fiber is oriented in the directions similar to the tensile direction (fiber group a), thereby easily exhibiting a reinforcing effect, the fibers which are oriented in directions different from the tensile direction and those fibers which are in a bent condition (fiber group b), have the problem that they tend to break before sufficiently exhibiting the performance characteristic required of a reinforcing fiber. Moreover, in particular, the fibers which are oriented in directions which make a large angle with respect to the tensile direction are more prone to exhibit unsatisfactory performance as reinforcing fibers.

When a stress is applied to an object, the fibers present therein which belong to fiber group b, are such that the tensile stress and the tensile direction in the fibers are not uniform in each fiber, but the stress is concentrated in a certain part of each fiber. The fiber (particularly PVA based fiber) has a tendency to be weak against a bending stress, or the tensile breaking tenacity under a bent condition, and thus it is easily broken without exhibiting a sufficient reinforcing effect. Therefore, when a hardened hydraulic article containing the reinforcing fibers is broken by tensile stress, many of the fibers are observed to be oriented in directions different from the tensile direction of the hardened article and are broken in their rupture cross-sections.

Only the behavior of the fibers of group a have been intensively studied, and it is believed that highly drawn fibers having a high tenacity and a low elongation are preferred as fibers. In the present invention, on the other hand, the inventors have found that it is necessary to investigate not only the behavior of the fibers of group a, but also those of fiber group b in order to achieve an excellent reinforcing effect in articles prepared from kneaded and formed hydraulic material, and the following specific ranges of elongation and flexing tenacity utilization factor have been established.

Specifically, the present invention is directed to fibers, as a reinforcing material, which have an elongation (A) of from 6–20%, a flexing tenacity utilization factor (B) of 35% or more, and (B)≧4(A). Such a reinforcing fibrous material exhibits an excellent reinforcing effect, not only in fiber group a, but also in fiber group b, and the toughness of the shaped article is considerably improved by using such a fiber. When the elongation and the flexing tenacity utilization factor are outside the ranges described above, a sufficient reinforcing effect cannot be obtained in a hydraulic system, in which the fiber reinforcing material is uniformly dispersed in a matrix.

Thus far only the reinforcing effect of fibers of group a has been studied, and fibers having a high tenacity and a low elongation have been used to improve the reinforcing effect of the fibers of group a. However, the tendency observed is that the less the elongation of the fiber, the less is the flexing tenacity utilization factor of the fiber. And thus while the fibers of group a exhibit an excellent reinforcing effect, the fibers of group b do not exhibit a sufficient reinforcing effect. In the present invention, by increasing the flexing tenacity utilization factor of the fiber, the reinforcing effect of the fibers of group b, which has substantially not been exhibited, is greatly improved, and as a result, the toughness of prepared articles is considerably improved.

Specific means for improving the flexing tenacity utilization factor of the fibers of group b are not particularly limited. A method which increases the elongation of fibers is preferably employed, because there is a tendency that when the elongation of the fiber is increased, the flexing tenacity utilization factor also increases. The reinforcing effect of the fibers of group a decreases when the elongation is made large, because the fibers tend to be pulled from the matrix. However, fibers having the elongation characteristic and the flexing tenacity utilization factor within the ranges defined in the present invention exhibit an excellent reinforcing effect, because the reinforcing effect of the fibers of group b, which has not been substantially exerted, is greatly improved even though the reinforcing effect of the fibers of group a is somewhat diminished.

In the present invention, the flexing tenacity utilization factor (B) is necessarily 35% or more, preferably 40% or more, more preferably 45% or more, and particularly preferably 50% or more. If the flexing tenacity utilization factor is too small, the fibers of group b easily break, and the resulting reinforcing effect becomes insufficient.

If the flexing tenacity utilization factor is too high, the reinforcing effect of the fibers of group a tends to decrease. In addition it is practically difficult to increase the flexing tenacity utilization factor above a certain range. Thus the flexing tenacity utilization factor is preferably 80% or less, more preferably 70% or less, and particularly preferably 65% or less.

The flexing tenacity utilization factor of the present invention, which is a value that can be an index of the reinforcing performance of the fibers of group b, can be measured by the method described in the Example.

The elongation (A) characteristic necessarily ranges from 6–20%, preferably 7% or more, and it is preferably 15% or less, more preferably 14% or less, and particularly preferably 13% or less. If the elongation is too high, the fibers of group a easily pull from the matrix, and the reinforcing effect of the fibers of group a is hardly exhibited, thereby decreasing the toughness of articles prepared from kneaded and shaped hydraulic material. If the elongation is too low, the reinforcing effect of the fibers of group b is very difficult to manifest, and thus the desired reinforcing effect cannot be obtained.

The flexing tenacity utilization factor of fibers is not always determined by the elongation of the fibers, but depends on the species of the fiber, the process of production of the fiber, the fineness and the polymerization degree of the polymer constituting the fiber and so on. Therefore, even if two kinds of fiber have the same elongation, they may have different flexing tenacity utilization factor values. However, because elongation is one of the important factors which determines the flexing tenacity utilization factor, if the elongation is too low, it is difficult for the fibers of group b to exhibit a sufficient reinforcing effect. Because highly stretched fibers having a low elongation are stiff and have low flexibility, if a stress is applied in a direction different from the longitudinal direction of the fiber as in the fibers of group b, it is difficult for the fibers to exhibit a sufficient mechanical performance and reinforcing effect. While the reinforcing effect of the fibers of group a tends to decrease upon increasing the elongation, a particularly considerable reinforcing effect can be obtained by setting the elongation within the specified range even though the reinforcing effect of the fibers of group a somewhat decreases.

In the invention, the elongation (A) and the flexing tenacity utilization factor (B) necessarily satisfy the relationship: (B)≧4(A). That is, when the elongation (A) is set high, the reinforcing effect of the fibers of group a is diminished as explained above, and thus the reduction of the reinforcing effect of the fibers of group a must be compensated by the reinforcing effect of the fibers of group b. Therefore, if the elongation is higher, the flexing tenacity utilization factor (B) must be higher, and specifically the flexing tenacity utilization factor (B) is preferably 4.5 times or more, more preferably 6 times or more, as large as the elongation (A). From the standpoint of the practical performance of the fiber, the fibers should particularly preferably satisfy the relationship: (B)≦15(A).

In the invention, the breaking tenacity of the fiber is necessarily 5 g/d or more, and preferably 6 g/d or more. If the breaking tenacity is too low, a sufficient reinforcing effect cannot be exhibited by either the fibers of group a or the fibers of group b. From the standpoint of production costs of the fibers, the breaking tenacity of the fibers is preferably 30 g/d or less, more preferably 20 g/d or less. The Young's modulus of the fiber is preferably 150 g/d or more, more preferably 200 g/d or more, and from the standpoint of the cost of production, the modulus is preferably 500 g/d or less.

Since the reinforcing material of the invention is subjected to kneading and forming, it must exhibit excellent uniformity in the dispersion of the fibers. In view of these factors, the fibers should have a fineness of 5 d or more, preferably 10 d or more, more preferably 12 d or more, and an aspect ratio (AP value) of 10 or more, preferably 20 or more but 500 or less, preferably 400 or less.

If the fineness of the fibers is too small or the aspect ratio is too large, uniformity of fiber dispersibility becomes unsatisfactory, and a sufficient reinforcing effect cannot be obtained because of the formation of fiber balls during kneading. On the other hand, if the aspect ratio is too small, the reinforcing effect is insufficient because the specific surface area of the fibers is too small to provide sufficient adhesion in the matrix, and a bridging effect cannot be obtained.

The fineness of the fibers can be adjusted by changing the diameter of the spinning nozzle and the draw ratio of the fiber spinning apparatus, and is preferably 9,000 d or less, and particularly preferably 6,000 d or less, from the standpoint of adhesion of the fibers to the matrix material. The aspect ratio (AP value) referred to in this invention is a value obtained by dividing the length of a fiber by the diameter of the fiber (the diameter of the circle having the same area as the transverse cross-section of the fiber).

The fiber reinforcing material of the invention may be a bundle of thread which is prepared by bundling plural pieces of fiber, but from the standpoint of the efficiency of the production process and cost of production, single fibers are preferably used as the reinforcing material without bundling.

In the case where the objective is to increase the uniformity of fiber mixibility and to suppress the formation of the first crack, the fineness of the fibers ranges preferably from 300–6,000 d, and particularly preferably from 3,000–5,000 d. The aspect ratio should preferably be at least 35, particularly preferably at least 40, and is preferably no more than 100, particularly preferably no more than 80. By using such a fiber, the formation of the first crack is suppressed, and the toughness of the product article is considerably improved. The amount of added fiber preferably ranges from 0.2–2% by volume.

While the fiber exhibits excellent uniform dispersibility, the fibers of group a are likely to be pulled from the matrix material because of their low adhesion to the matrix material because of their small specific surface area. Thus, the elongation is preferably set relatively low to within the range specified in this invention. Specifically, the elongation is normally 7% or more and normally 13% or less, preferably 12% or less, and particularly preferably 10% or less.

When the objective is to improve the impact resistance of an article after the formation of the first crack, the fineness of the fibers preferably ranges from 5–100 d, and the aspect ratio preferably ranges from 20–500. In particular, the fineness is normally 10 d or more, preferably 12 d or more and is preferably 50 d or less, more preferably 30 d or less.

The aspect ratio preferably ranges from 20–500, normally 60 or more, preferably 70 or more, and particularly preferably 80 or more, and is normally 400 or less, preferably 300 or less, and particularly preferably 200 or less. By using such fibers as the reinforcing material, not only is the reinforcing effect of the fibers of group b considerably improved, but also the transmission of stress is easily conducted. Thus, not only the formation of the first crack is suppressed, but also diminishment of the bending load of the hardened article after the formation of the first crack is suppressed, thereby preparing a kneaded and shaped article having excellent impact resistance. If the fineness of the fiber is large, effective transmission of the stress on the fiber is difficult because of the small specific area and because of the small number of fibers. Thus the impact resistance after the first crack is not considerably improved compared to shaped objects prepared from fibers of small diameter fiber, although the formation of the first crack is effectively suppressed. Therefore, in the case where the impact resistance of the shaped article should be improved, fibers having a small diameter are preferably mixed in the hydraulic material.

If the fibers of group b break because of localization of stress, or if the bridging effect is not sufficient because of low tensile strength or low frictional resistance, multiple cracking does not occur. As for cracking in the bending test, it is preferred that many cracks (multiple-cracking) form on the side tensile stress is applied. In the case where both the fiber group a and fiber group b exhibit a reinforcing effect, not only the formation of the first crack is suppressed, but also the impact strength is improved, because of stress dispersion prior to fiber breakage which results in generation of a bridging effect by many other fibers. While there is a limit in fiber tenacity of one fiber, because the number of fibers can be increased in the case of fibers having a small diameter, the progress of the first crack is prevented by improved integration of many fibers which have a distribution in strain, and cracks are formed in the other regions of the matrix to form multi-crack. An article which breaks in such a process has excellent impact resistance and seismic resistance. From the standpoint of improvement in seismic resistance, it is preferred to increase the number of reinforcing fibers, which fibers are preferably added in an amount of from 1–4% by volume.

A fine fiber has a lower absolute strength(g) (not normalized to g/d by dividing by fineness) because of its small diameter in comparison to a coarse fiber, so the bridging effect of such a fiber depends on its tenacity to a certain extent. Therefore, a fine fiber preferably has a higher breaking tenacity (g/d) than a coarse fiber. Specifically, the tenacity is normally 9 g/d or more, preferably 10 g/d or more, more preferably 11 g/d or more. The upper limit is not particularly set, and is generally 30 g/d or less.

Specifically, when the deflection, at which the first crack is formed when conducting a bending test, is assumed to be A mm, and the bending load at that time is assumed to be B kgf, the deflection, at which the bending load becomes B kgf after formation of the first crack, is normally 11A mm or more, preferably 12A mm or more, more preferably 13A mm or more, and most preferably 15A mm or more. Such a hardened article exhibits excellent impact strength, because the bending load on the article is kept at a high value even after the first crack. The upper limit of the amount of the deflection, at which the bending load becomes B kgf, is not particularly limited, and is generally 30A mm or less.

While the specific value of the bending load changes depending on the shape, size and composition of the hardened article, it is preferred that the load at the formation of the first crack is 100 kgf or more, particularly 150 kgf or more, and it is also preferred that the bending load becomes larger after the formation of the first crack. The maximum bending load is preferably 1.2 times or more, more preferably 1.5 times or more, and particularly preferably 1.6 times or more, the load at the formation of the first crack, and it is generally 5 times or less.

The point of the formation of the first crack referred to in the present invention means the point at which the load exhibits the maximum value as far as the load and the deflection exhibit a proportional relationship on the bending load deflection curve.

A further considerable effect can be obtained when the pull-out resistance, as an index of bonding (affinity) between the fiber and the matrix, ranges from 1–10 $N/mm^2$, preferably from 2–9 $N/mm^2$. By controlling the bonding affinity within an adequate range at which fibers can not be pulled out so easily, but the fibers can move to some extent, stress can be dispersed easily because of the freeness of a bent fiber and breakage of a fiber before stress dispersion does not occur easily. Therefore, the reinforcing effect of the fibers of group b is increased by the above means in synergy with improvement of flexing tenacity of fiber. This tendency is increased particularly in the case of fibers having a 100 d or less.

The affinity of the fiber and the matrix is preferably controlled by appropriate selection of fiber material and hydraulic material, and in some cases, their affinity is preferably decreased. For example, PVA based fibers having a fineness of 100 d or less have high affinity to a hydraulic material and exhibit an excellent reinforcing effect as the fibers of group a, but for the fibers of group b, stress is concentrated at a part of the fibers, since the fibers firmly adhere to the matrix. A problem arises in that the fibers are liable to break before the stress is dispersed. However, a further excellent effect can be obtained by suitably decreasing the affinity of the hydraulic material.

Specific means for decreasing the affinity of the fibers to the hydraulic material include applying or coating a hydrophobic substance such as an epoxy resin, a polyolefin resin, a polyethyleneoxide resin or a fluorine based compound to the fibers. PVA having been modified with a hydrophobic group may be applied to the surface of the fiber. The amount of hydrophobic substance attached to the fiber preferably ranges from about 0.1–10% by weight. In the case where fibers exhibiting a low pull-out resistance (fiber having high hydrophobic property) are employed, the bond of fiber to the matrix can be increased by chemical methods such as by activating the fiber surface using a plasma treatment at a low temperature, or by geometrical demolding such as etching and indentation.

The species of the reinforcing fiber used in the invention is not particularly limited, and is preferably polyvinyl alcohol (PVA) based fiber from the standpoint of weather resistance, mechanical performance and alkali resistance.

In the case where the affinity between the PVA based fiber and the hydraulic material is decreased, affinity is preferably controlled by applying a polyethyleneoxide resin. The polyethyleneoxide resin has high affinity to the PVA based resin and has a moderate affinity to the hydraulic material, and thus good results can be obtained.

The PVA based fiber used in the invention is not particularly limited, as far as it satisfies the values mentioned above. The vinyl alcohol based polymer constituting the PVA based fiber preferably has an average degree of polymerization obtained by the viscosity method in an aqueous solution at 30° C. of from 500–24,000, preferably 1,000 or more, and more preferably 1,500 or more. By using such PVA, PVA fibers having a high modulus of elasticity can be easily obtained. In view of cost, the modulus of elasticity is preferably 5,000 or less.

The saponification degree normally is 99% or more, preferably 99.8% or more, from the standpoint of heat resistance, durability and dimensional stability. PVA to which other modifying units are introduced can also be used. The introduction of the modifying units can be conducted by either copolymerization or post-polymerization. The amount of the modifying unit normally is 30% by mol. or less, preferably 10% by mol. or less.

The reinforcing fiber is not necessarily composed of only the vinyl alcohol based polymer, but other additives and other polymers may be mixed with the PVA to prepare the fiber, and it may be conjugated fiber or sea-island fiber with other polymers. A more preferred PVA is one which has a high weathering resistance and the surface of the fiber exhibits alkali resistance.

The process of production of the PVA based fiber suitably used in the invention is not particularly limited. The fiber can be produced by the wet spinning method, the dry spinning method, and the dry and wet spinning method. The dry spinning method is a method in which spinning is conducted while providing a space (air gap) filled with air or an inert gas between the spinning nozzle and the coagulation bath. The shape of the hole of the nozzle is not particularly limited, and may be circular or some other profile. Suitable examples include a flat form, a cross-shaped form, a T-shaped form, a Y-shaped form, an L-shaped form, a triangular form, a square form and a star-shaped form.

In the case where a fiber having a fineness of 500 d or more is produced, because it is difficult to remove water from a thick stream of a spinning solution (wet spinning), when an aqueous solution of a vinyl alcohol based polymer is used as the spinning solution, spinning is preferably conducted by dry spinning.

Specific examples include a method in which a spinning solution comprising an aqueous PVA solution having a PVA concentration of from 30–50% by weight is extruded from a spinning nozzle into a gaseous atmosphere. Air is generally used as the gas, and the temperature of the gas is generally from 60–90° C. A spinning base thread can be produced by drying the resulting thread at a temperature preferably from 100–200° C.

In the case where fiber having a fineness of less than 500 d is produced, the fiber is preferably produced by the wet spinning method or the dry and wet spinning method.

Specific examples include a method in which a spinning solution comprising an aqueous solution containing PVA is wet-spun into a coagulation bath at room temperature containing an inorganic salt which functions as a dehydration agent. The concentration of the PVA based polymer in the spinning solution normally ranges from 5–30% by weight, and preferably from 10–20% by weight, depending on the degree of polymerization thereof.

Other additives can also be added thereto depending on necessity. For example, one or more surface active agents or inorganic substances may be added to the spinning solution to increase the life of the spinning nozzle and to increase the stability of a drawing process. Boric acid and a borate may be added to the spinning solution.

The coagulation solution is not particularly limited, as long as it coagulates the spinning solution. From the standpoint of process efficiency and cost, a coagulation solution which employs water as a solvent is preferably used. Specifically, an aqueous solution of a salt which functions as a dehydration agent such as sodium sulfate (Glauber's salt), ammonium sulfate and sodium carbonate is normally employed. The concentration of the aqueous solution may be selected from 100 g/L or more to the saturated concentration, and is preferably as close as possible to the saturated concentration, since such a solution has a high dehydration and coagulation function. From the standpoint process efficiency and cost, a saturated aqueous solution as a coagulation bath is preferably used.

A method can also be preferably employed in which a spinning solution containing boric acid in an amount of about from 0.1–3% by weight is extruded into an alkaline coagulating bath containing sodium hydroxide and so on. The temperature of the coagulation bath preferably ranges from 20–70° C., particularly preferably from 30–50° C. The thread released from the coagulation bath is then wet-drawn and dried to easily prepare a spinning base thread.

In the case where a fiber of 50 d or less is produced, because such a fiber has high toughness and does not exhibit much stickiness, the fiber is preferably produced by wet discharging a spinning solution obtained by dissolving PVA in a solvent into a coagulation bath. A preferred method is as follows:

A suitable solvent for the production of the fiber is an organic solvent which preferably dissolves PVA, and such solvents include polar solvents such as dimethylsulfoxide (DMSO), dimethylformamide and dimethyl imidazoline, and polyhydroxy alcohols such as glycerin and ethylene glycol. A mixture of two or more of these solvents may be used, as well as a mixture of water with one of the solvents. Among these solvents DMSO is a preferred solvent, since it can dissolve PVA at a relatively low temperature to prevent heat degradation and coloring of the PVA solution. Since DMSO has a relatively high freezing temperature, the coagulation temperature of the coagulation bath is preferably decreased by adding methanol in a low concentration. The concentration of PVA in the spinning solution varies depending on the polymerization degree of PVA and the particular solvent used, and is generally from 2–30% by weight, preferably from 3–20% by weight.

As the coagulation bath, an organic solvent having the ability to coagulate PVA is used. There is no limitation on the coagulation bath, as long as it has the ability to coagulate PVA, for example, an alcohol such as methanol or ethanol, or a ketone such as acetone or methyl ethyl ketone. Among these, methanol is preferred since it is cheap. It has a relatively moderate coagulation ability and can easily form a uniform fine crystal structure. In order to prepare a fiber having a high tenacity in the invention, the solvent for the solution may be present in the coagulation bath. The content of the solvent in the solution varies depending on the species of the organic solvent having a coagulation function, and is normally from 10–50% by weight, preferably from 15–45% by weight, so that a uniform gel can be easily obtained.

The temperature of the coagulation bath is preferably 20° C. or less, and when it exceeds 20° C., non-uniform coagulation occurs by an initial phase separation of the coagulated thread which becomes opaque. A fiber having a high tenacity cannot be obtained. It is preferred that the temperature of the coagulation bath be 15° C. or less, and particularly 10° C. or less, from the standpoint of obtaining a uniform coagulated thread.

The spinning method employed in the invention may be the dry and wet spinning method in which an air gap layer is present between the nozzle and the coagulation bath, or it can be the gel spinning method. Preferably, the wet spinning method is employed, in which the nozzle is in direct contact with the coagulation bath, from the standpoint of performance of the fiber and efficiency of the spinning process.

The resulting bundle of coagulated threads is soaked in an extraction bath to wash and remove the solvent of the solute present in the bundle of coagulated threads. The extraction bath is preferably constituted of an organic solvent having a coagulation function. The bundle of threads is subjected to wet thermal drawing from 2.5–5.5 times. The bundle of threads is dried to prepare a spinning base thread.

The spinning base thread can be obtained by various methods as described above. It is preferably prepared by subjecting the fiber to wet thermal drawing at a high temperature in order to promote orientation and crystallization of the fiber. This improves the performance of the fiber. Particularly, in the case where the method described above is employed, in which the spinning solution containing an organic solvent is used, a fiber having excellent mechanical characteristics can be obtained, since the fiber exhibits little tendency to stick. Specifically, a fiber having a tenacity of 9 g/d or more can be obtained.

The method employed for thermal drawing of the fiber is not particularly limited, and a non-contact type or contact type heater, a hot air furnace, an oil bath or high temperature steam may be employed. Of these methods, thermal drawing is preferably conducted in a drawing furnace of the hot air type over a period of time of about 20 seconds to 3 minutes, during which the thermal drawing may be conducted in two or more steps by controlling the temperature in plural stages. The thermal drawing is preferably conducted in such a manner that the drawing temperature is 200° C. or more, and more preferably from 220–250° C., and wherein the total drawing ratio ranges from 8–25 times, preferably from 9–18 times.

In the case where a general fiber having a high tenacity and a low elongation is produced, drawing is generally conducted to about 80–90%. In the invention, the drawing is preferably conducted from 50–75% from the standpoint that the fiber having a relatively high elongation is produced.

The elongation of the fiber can also be adjusted by, for example, subjecting the drawn fiber to a suitable shrinkage treatment. Preferably, the fiber is maintained in a heating furnace having a temperature higher than the drawing heating furnace by from 2–5° C. under the condition that the fiber is suitably relaxed, i.e., including the shrinkage amount, and then the fiber is heat treated under these conditions in order to increase elongation of the fiber. The elongation can be increased by increasing the shrinkage amount. In general, the shrinkage ratio ranges from 3–20%, preferably from 5–15%.

By increasing the drawing ratio, the tenacity of the fiber is increased but its elongation is decreased. By increasing the amount of shrinkage, the elongation is increased but the mechanical performance is decreased. Therefore, it is preferred that the various conditions such as the amount of spinning solution discharge, the drawing condition and the shrinkage condition are suitably adjusted to prepare the desired fiber.

While the elongation can be increased by increasing the shrinking ratio, there are cases when the flexing tenacity utilization factor cannot be increased by increasing the elongation depending on conditions such as the type of polymer employed, the degree of polymerization, the spinning method, the spinning conditions, the drawing conditions, which include the drawing ratio and the drawing temperature, and the shrinking treatment temperature. Therefore, these conditions should be suitably adjusted to prepare the desired flexing tenacity utilization factor characteristic of the fiber.

The fiber of the invention exhibits excellent performance as a reinforcing material for an article prepared by kneading and forming a fiber containing matrix material. The volume fraction of the fiber can be suitably determined, and it is normally 0.01% by volume or more based on the amount of the matrix, preferably 0.1% by volume or more, and more preferably 0.5% by volume or more, from the standpoint of reinforcement, and is normally 10% by volume or less, preferably 5% by volume or less, and more preferably 4% by volume or less, from the standpoint of uniform dispersibility.

Because the fiber of the present invention exhibits an excellent reinforcing effect, the reinforcing effect of a prepared abject can be considerably increased by adding a very small amount of the fiber to the matrix material.

A kneaded and formed article which exhibits excellent performance characteristics such as toughness can be obtained by mixing the fiber of the invention as a reinforcing material in a hydraulic matrix material. As to the specific method of preparation used, for example, the spray method, the injection method, the pressure method, the vibrating method, the method utilizing vibration and pressure, the centrifuge method, the winding method, the vacuum method and the extrusion method can be employed. Of course, a product prepared by employing the fiber reinforced material as a plastering material is within the scope of the invention.

The term kneading and forming used in the specification means a method in which the fiber of the invention is uniformly mixed in a matrix material in which water is present in the form of a mud, and the mixture is then formed into the desired shape by the method described above This method is clearly distinguished from the paper-manufacturing method conventionally employed. In the invention, superior effects can be exhibited even in the case of a mixture prepared by mixing the solids content and water in an amount of about 100/15 to 100/60, particularly 100/15 to 100/40, i.e., a mixture having a lower water content, and thus a lower flowability than the mixture used in the paper-manufacturing method.

The hydraulic material of the invention is not particularly limited, and examples thereof include gypsum, gypsum slag and magnesia, with cement preferably being used. A representative example of cement is Portland cement, and Portland blast cement, fly ash cement, alumina cement and mixtures of these cements.

The reinforcing material of the invention also exhibits an excellent reinforcing effect in mortar and concrete containing an aggregate which is likely to be damaged whereby it is difficult to exhibit a reinforcing effect.

As a fine aggregate, river sand, sea sand, land sand, crushed sand and crushed stone are employed, and as a coarse aggregate, cobblestone and crushed stone can be employed. Furthermore, artificial light weight aggregate and filler may be mixed, and specific examples thereof include slag and limestone, as well as foamed perlite, foamed obsidian, calcium carbonate, vermiculite and Shirasu balloon. Furthermore, a flowing agent, an air entraining agent (AE), superplasticizer, a water reducing agent, a thickener, a water holding agent, a waterproofing agent, an expanding agent, an accelerating agent and a retarding agent can be used in combination as additives.

A fine aggregate which is used in the invention includes an aggregate, 95% by weight of which passes through a sieve having an opening diameter of 5 mm, and a coarse aggregate means an aggregate, from 0–10% by weight of which passes through a sieve having an opening diameter of 5 mm.

The composition of the hydraulic material is not particularly limited. In the system which contains a mixed coarse aggregate, fibers having a fineness of f rom 300–6,000 d, preferably from 3,000–5,000 d, are preferably mixed therein, since the fibers are stiff and their mechanical characteristics are difficult to lose, and further they have good dispersibility. The fiber normally has an aspect ratio of 35 or more, preferably 40 or more, more preferably 100 or less, more preferably 80 or less. By using such fiber, the formation of the first crack is effectively suppressed. In order for the reinforcing material to exhibit a bridging effect in the system mixed with a coarse aggregate, the length of the reinforcing material should be long to a certain extent. In the case of fiber having a large diameter, a high reinforcing effect can be obtained since excellent dispersibility can be obtained even when the length of the fiber is made certainly long.

In the case where the main objective is to improve the impact resistance of a product article after the appearance of the first crack therein, it is preferred that the system substantially not contain a coarse aggregate, so that the stress is smoothly transmitted. The smooth transmission of stress is further effectively facilitated by mixing fibers having a fineness of from 5–100 d and an aspect ratio of from 20–500 in the hydraulic matrix material so as to achieve an extended excellent effect. In the case where a coarse aggregate is mixed in the matrix material, there are cases where the transmission of stress is inhibited, and the fiber which have a small diameter are damaged upon kneading. The fiber normally has a fineness of 10 d or more, preferably 12 d or more, and normally 50 d or less, preferably 30 d or less. The aspect ratio of 20 the fiber is normally 60 or more, preferably 70 or more, and more preferably 80 or more, and is preferably 400 or less. Of course, the fiber may be used in combination with other fibers having a large diameter.

Suitable examples of the present composition include the specimen used in the measurement of the toughness coefficient in the Examples. Specifically, in the system containing no coarse aggregate (mortar), a composition comprising from 80–120 parts by weight of cement and from 40–80 parts by weight of water is preferred, to which other additives may be added. For example, at least one of from 80–120 parts by weight of siliceous sand, from 10–50 parts by weight of silica fume, from 0.1–5 parts by weight of methyl cellulose and from 0.1–5 parts by weight of a superplasticizer are preferably mixed in a cement. A preferred composition is one in which all of these ingredients are mixed.

In the system containing a coarse aggregate (concrete), a composition comprising from 80–120 parts by weight of cement, from 120–200 parts by weight of water and from 200–400 parts by weight of a coarse aggregate is preferred, to which other additives, such as a water reducing agent, may be added. It is also preferred that from 20–100 parts by weight of a fine aggregate is mixed in with the ingredients of the composition.

As specific examples of the kneaded and shaped articles of the invention, all cement and concrete shaped articles and secondary products thereof are within the scope of the invention including slate plates, pipes, wall panels, floor panels, roof plates, partition walls, paving materials, tunnel linings, slope protection materials and concrete factory products. Furthermore, other than the cement products described above, the kneaded and shaped article of the invention can be used as a structural material, an interior and exterior finishing material and a construction material. Furthermore, the composition of the invention can be used as a mortar for plastering, and also can be used as a grounding of a machine, a pressure vessel of a nuclear reactor and a vessel for liquefied natural gas.

Having now generally described the invention, a further understanding can be obtained by reference to certain specific Examples which are provided herein for purpose of illustration only and are not intended to be limiting unless otherwise specified.

Fineness d

The weight of the constant thread length of the resulting fiber-like substance was measured, and the apparent fineness was calculated at n=5 to obtain the average value. The fineness of the thread could not be measured by the measurement of the weight of the constant thread length (fiber with a small denier). Rather, the fineness was measured with a vibroscope.

Density g/cm$^3$

The density of the thread was measured by the density gradient tube method using carbon tetrachloride and n-hexane as solvents (measuring atmosphere: 20° C.).

Tenacity g/d, Young's Modulus g/d, Elongation %

The fiber to be measured was allowed to stand under the conditions of a temperature of 20° C. and a relative humidity of 65% for 24 hours, and a single fiber was subjected to the measurement of a fiber tenacity at a gauge length of 20 cm and a Young's modulus at a tensile rate of 10 cm/min by a tensile tester "Autograph manufactured by Shimadzu Corp." The elongation was calculated by the expression:

$$\frac{\text{single fiber breaking elongation (cm)}}{\text{gauge length (cm)}} \times 100$$

If the length of the fiber was shorter than 20 cm, the measurement was conducted with the length of the sample as long as possible as the gauge length.

Flexing Tenacity Utilization Factor %

The fiber to be measured was set vertically in a form 40 mm square and a mortar of cement/siliceous sand/water=1/1/0.4 (weight basis) was cast into the mold (embedded length of fiber: 40 mm), followed by sufficient vibration as shown in FIG. 1. The mortar was cured under the conditions of 25° C. and 65% RH for 24 hours and then in water, to obtain a hardened article. Ordinary Portland cement (produced by Asano Cement Co., Ltd.) was used as the cement, and silica #4000 (Blaine value: 4,000 cm²/g, produced by Keiwa Rozai Co., Ltd.) was used as the siliceous sand.

The fiber 2 embedded in the prepared article 3, which was fixed in position 4, was subjected to a tensile test at a flexing angle of 45° C. to the longitudinal direction 1 of the embedded fiber at a tensile rate of 0.5 mm/min in a tensile tester (Autograph AG-5000 B manufactured by Shimadzu Corp.), thereby obtaining the breaking stress (g/d) as the flexing tenacity.

The ratio (%) of flexing tenacity (g/d) to the fiber tenacity (g/d) was measured and designated as the flexing tenacity utilization factor.

Pull-Out Resistance N/mm²

Ordinary Portland cement (produced by Asano Cement Co., Ltd.) was dry mixed with the same amount of silica #4000 (Blaine value: 4,000 cm²/g, produced by Keiwa Rozai Co., Ltd.) in a Hobart mixer for 2 minutes, and water was added in such an amount that the water/cement ratio was 0.4, followed by wet mixing for 2 minutes. The mixture was cast on a polyethylene film having a thickness of 0.2 mm in an aluminum vat and screened to a thickness of 5–10 mm. Partition flames made of thin wood (3 cm×3 cm) were embedded therein, and a single fiber was embedded in each flame.

The embedding of each fiber was conducted in the following manner. A mark is applied to a needle at the depth, into which the fiber was expected to be inserted into the matrix, and the needle was inserted into the matrix in the direction perpendicular to the surface of the matrix. The fiber was inserted into the matrix to that depth (to the bottom of the matrix layer in cases other than fiber having thin denier). In the case where a fiber is too fine to be embedded by the method described above, it can be embedded as follows:

First a fiber is set in a form in advance;
Secondly, mortar is cast in a form.
Thirdly the mortar after curing is thinned by grinding if necessary. The embedded length of the fiber can be suitably changed, and it is preferred that the embedded length range from 1–2 mm or less in the case of fiber of 100 d or less.

After inserting the fiber, the mortar in the aluminum vat was sealed in a plastic bag, and was subjected to the first curing at 50° C. for 20 hours, and then further cured in a room at 20° C. for 21 days kept in the plastic bag. After curing, paint was sprayed on the exposed portion of the fiber, which enabled the measurement of the embedded length Lb after the pull-out test. Then the mortar was demolded and separated into several specimens. A pull-out test was conducted at a rate of 2 nun/min by using Autograph (5000-AGB manufactured by Shimadzu Corp.) to obtain a load-displacement curve.

The maximum load Pa (kgf) was read from the record of load/displacement of pull-out, and the pull-out resistance was calculated by the equation below. The test was conducted on 5 samples (n=5), except for the case where a fiber breaks on the pull-out test, and the average value of the resulting values was calculated. The embedded length Lb (mm) was a value obtained by measuring the embedded length after the pull-out test with a unit of ⅒ mm, and the girth L (mm) was calculated from the average fineness Dr (denier) and the fiber density A (g/cm³) by the expression: $0.2 \cdot (Dr \cdot \pi/(90 \cdot A))^{1/2}$ on the assumption that the cross section of the fiber was a circle.

Pull-out resistance (N/mm²)=9.8·Pa/(L×Lb)

Toughness Index N/mm² (systems containing no fiber reinforcing material of 100 d or less)

A 193 kg amount of ordinary Portland cement, 113 kg of a fine aggregate (pit sand from Kisarazu), 611 kg of a coarse aggregate (crushed stone #6 from Hachioji, maximum diameter: 13 mm), 350 kg of water and 0.88 kg of a water reducing agent (Pozzolys #70) were placed in a bi-axial forced mixer, and kneaded for 1 minute to produce plain concrete. Fiber was added to the plain concrete in an amount of 0.75% by volume, followed by kneading for 1 minute, and a sample (prism of 10 cm×10 cm×40 cm) was produced by using the resulting slurry according to the standard of the Japan Society of Civil Engineering JSCE-F552 "Method of making specimens for measuring Strength and Toughness of Steel Fiber Reinforced Concrete". The specimen was subjected to curing at room temperature of 20° C. and a humidity of 65%, followed by demolding, and then cured in water at 20° C. for 28 days. The toughness index of the resulting specimen was measured by the third point bending test using a multi-function tester manufactured by Shimadzu Corp. according to the standard of the Japan Society of Civil Engineering JSCE-G522 "Testing Method of Flexural Strength and Toughness of Steel Fiber Reinforced Concrete". The higher the toughness index of the shaped article, the more excellent the toughness (impact resistance).

The flexural strength was calculated by $P \cdot 1/(b \cdot h^2)$, and the toughness index was calculated in such a manner that the area Tb under the load-deflection curve from a deflection of zero to 1/150 of the span was obtained, and the toughness coefficient was obtained by the expression:

(Tb/Stb)·(l/bh²).

P represents the maximum load shown by the tester (N), l represents the span length (cm), b represents the width of the rupture cross-section (cm), h represents the height of the rupture cross-section (cm), and Stb represents the deflection to 1/150 of the span (cm).

Toughness Index (systems containing fiber reinforcing material of 100 d or less), Flexural Load-Deflection Test The composition of the hardened product used in the test was as follows. Specifically, ordinary Portland cement (produced by Chichibu Onoda Cement Corp.), siliceous sand #7 (produced by Toyo Materan Corp.), silica fume (produced by EFACO Corp.), methyl cellulose (Himethollose 90SH30000 produced by Shin-Etsu Silicone Co., Ltd.), an AE superplasticizer (SP-8N produced by Pozzolys Corp. and PVA based fiber (produced by Kuraray Co., Ltd.) were combined.

| Cement | 100 parts by weight |
|---|---|
| Siliceous sand #7 | 100 parts by weight |
| Silica fume | 0.4 part by weight |
| Methyl cellulose | 1.5 parts by weight |
| AE superplasticizer | 0.75 part by weight |
| water | 60 parts by weight |

The PVA based fiber was added to the matrix having the composition described above in an amount of 3% by volume.

The composition was mixed and kneaded in an omni-mixer (OM-5 produced by Chiyoda Giken Co., Ltd.) and then poured into a forming flame of 4 cm×4 cm×16 cm. The material obtained was allowed to stand at room temperature for 24 hours, and then subjected to curing in water at room temperature for 6 days, to prepare a sample. In the case where the hardened article was larger than the size of 4 cm×4 cm×16 cm, the sample was cut into the same size for evaluation of performance. The toughness index ($I_{20}$) was measured according to ASTM C1108–94. The higher the toughness index of the formed article, the more excellent the toughness (impact resistance).

The three-point flexural test was conducted using the same sample in an Autograph produced by Shimadzu Corp. at a span length of 150 mm and a load application speed of 0.5 mm/min, so as to prepare a flexural load-deflection curve.

The point at which the load exhibits the maximum value, as far as the load and the deflection exhibit a proportional relationship on the bending load-deflection curve, was designated as the point of formation of the first crack, and the deflection A and the load B at this point were read from the curve. The deflection C showing the load B was similarly read. The load-deflection curves were prepared for three or more specimens, to measure A, B and C, and the sample was evaluated using the average values thereof. The maximum flexural load was read from the curve, and the average value thereof was obtained.

In the case where two or more points, at which the load B was exhibited after the formation of the first crack, were present, the point exhibiting the largest deflection was adopted as the point for C. The larger the C/A, the more excellent the vibration resistance.

EXAMPLES

Example 1

A PVA having an average polymerization degree of 1,700, as measured by the viscosity method, and having a saponification degree of 99.8 mol. %, was added to DMSO to prepare a spinning solution (PVA concentration: 18% by weight). It was then extruded from a round nozzle having a hole diameter of 0.2 mm and a number of holes of 100 into a coagulation bath having a temperature of 5° C. and a weight ratio of methanol/DMSO of 70/30, to conduct wet spinning. The resulting bundle of coagulated threads was subjected to drawing 3 times in a wet drawing bath having a mixing weight ratio of methanol/DMSO of 95/5 and a temperature of 50° C., and then DMSO was extracted and removed by contact with a countercurrent flow of methanol, followed by drying. The threads were subjected to thermal drawing at 230° C. to a total drawing ratio of 10 times, and then subjected to a shrinkage treatment of 10% at a temperature of 235° C., so as to produce fiber. A polyethyleneoxide oily agent ("VOS513" produced by Takemoto Oil and Fat Co., Ltd.) was applied to the resulting fiber in an amount of 0.5% by weight based on the fiber, and the fiber was cut into the length shown in Table 1, to obtain a reinforcing material. The results obtained are shown in Table 1.

Example 2

A reinforcing material was obtained in the same manner as described in Example 1 except that the drawing ratio was 14 times and the shrinkage ratio was 7.5%.

Example 3

A PVA having an average polymerization degree of 1,700, as measured by the viscosity method, and having a saponification degree of 99.9% by mol., and boric acid were added to water to prepare a spinning solution (PVA concentration: 16.5% by weight, boric acid concentration: 1.8% by weight based on PVA). The spinning solution was then extruded from a round nozzle having 2,000 holes each having a hole diameter of 0.2 mm into a coagulation bath at a temperature of 40° C. and having a Glauber's salt concentration of 380 g/L and a sodium hydroxide concentration of 12 g/L, to conduct wet spinning. The resulting bundle of threads was subjected to roller-stretching twice, washed with water to decrease the boric acid concentration to 0.4% by weight based on PVA, wet drawn 1.5 times in a wet drawing bath of saturated Glauber's salt at a temperature of 75° C., followed by drying. The threads were subjected to thermal drawing at 230° C. to a total drawing ratio of 14.5 times. A polyethyleneoxide oily agent ("VOS513" produced by Takemoto Oil and Fat Co., Ltd.) was applied to the resulting fiber in an amount of 0.5% by weight based on the fiber, and the fiber was cut into the length shown in Table 1, to obtain a reinforcing material. The results obtained are shown in Table 1.

Examples 4 and 5

A PVA having an average polymerization degree of 3,300, as measured by the viscosity method, and having a saponification degree of 99.9% by mol., and boric acid were added to water to prepare a spinning solution (PVA concentration: 12% by weight, boric acid concentration: 1.8% by weight based on PVA). The spinning solution was then extruded from a round nozzle having 2,000 holes, each hole having a diameter of 0.2 mm, into a coagulation bath at a temperature of 65° C. and having a Glauber's salt concentration of 350 g/L and a sodium hydroxide concentration of 12 g/L, to conduct wet spinning. The resulting bundle of threads was subjected to drawing twice by roller drawing and then subjected to wet drawing 1.5 times in a bath of saturated Glauber's salt at a temperature of 75° C., followed by drying. The threads were further subjected to thermal drawing at 238° C. at a total drawing ratio of 21 times. The threads were then subjected to a shrinkage treatment of 4.4% at 242° C., to prepare fiber. A polyethyleneoxide oily agent ("VOS513" produced by Takemoto Oil and Fat Co., Ltd.) was applied to the resulting fiber in an amount of 0.5% by weight based on the fiber, and the fiber was cut into the length shown in Table 1, to prepare a reinforcing material. The results obtained are shown in Table 1.

Example 6

A PVA having an average polymerization degree of 1,700, as measured by the viscosity method, and having a saponification degree of 99.9% by mol., was added to water to prepare a spinning solution (PVA concentration: 41% by weight). The spinning solution was then extruded from a round nozzle having a hole diameter of 0.1 mm and a number of holes of 2,000 into the air at a temperature of 95° C., and dried to the completely dried state. The resulting bundle of threads was subjected to thermal drawing 12 times in a drawing furnace of the hot air type at 243° C., and then subjected to a shrinking treatment of 3.0% at 248° C., to prepare fiber. A polyethyleneoxide oily agent ("VOS513" produced by Takemoto Oil and Fat Co., Ltd.) was applied to the resulting fiber in an amount of 0.5% by weight based on the fiber, and the fiber was cut into the length shown in Table 1, to prepare a reinforcing material. The results obtained are shown in Table 1.

Example 7

The same procedure as described in Example 6 was repeated except that the oily agent was not applied to the fiber.

Example 8

A PVA having an average polymerization degree of 1,700, as measured by the viscosity method, and having a saponification degree of 99.8% by mol., was added to DMSO to prepare a spinning solution (PVA concentration: 18% by weight). The spinning solution was then extruded from a round nozzle having 100 holes with each hole having a diameter of 0.4 mm into a coagulation bath having a temperature of 5° C. and a weight ratio of methanol/DMSO of 70/30, to conduct wet spinning. The resulting bundle of coagulated threads was drawn three times in a wet drawing bath having a mixing weight ratio of methanol/DMSO of 95/5 and a temperature of 50° C., and then DMSO was extracted and removed by contact with a countercurrent flow of methanol, followed by drying. The threads were subjected to thermal drawing at 230° C. to a total drawing ratio of 14 times, and then subjected to a shrinkage treatment of 7.5% at a temperature of 235° C., so as to produce fiber. A polyethyleneoxide oily agent ("VOS513" produced by Takemoto Oil and Fat Co., Ltd.) was applied to the resulting fiber in an amount of 0.5% by weight based on the fiber, and the fiber was cut into the length shown in Table 1, to obtain a reinforcing material. The results obtained are shown in Table 1.

Examples 9 and 10 and Comparative Examples 1 and 2

Reinforcing materials were obtained in the same manner as described in Example 2 except that the cut length was changed. In Comparative Example 1, the aspect ratio was too small to obtain a sufficient reinforcing effect. In Comparative Example 2, the aspect ratio was so large that dispersibility was decreased and sufficient reinforcing effect could not be obtained. The results obtained are shown in Table 1.

Comparative Example 3

The same procedures were conducted as described in Example 1 except that "RMU182" produced by Kuraray Co., Ltd. was used as the fiber. Because the diameter of the fiber was too small, fiber balls form upon kneading of the fiber, and also because the flexing tenacity utilization factor was too small, the reinforcing effect was low. The pull-out resistance in Comparative Example 3 could not be measured as the fiber broke before it was pulled out. This occurred because the adhesion of the reinforcing material to the matrix was high, and because of the small diameter of the fiber. The results obtained are shown in Table 1.

Comparative Example 4

A reinforcing material was obtained in the same manner as described in Example 1 except that the drawing ratio was changed to 14 times and the shrinkage ratio was changed to 0%. The sufficient reinforcing effect could not be obtained, because the elongation and the flexing tenacity utilization f actor were too low. The results obtained are shown in Table 1.

Comparative Example 5

A reinforcing material was obtained in the same manner as described in Example 1 except that the drawing ratio was changed to 13.5 times and the shrinkage ratio was changed to 0%. The sufficient reinforcing effect could not be obtained, because the elongation and the flexing tenacity utilization factor were too low. The results obtained are shown in Table 1.

Example 11

A PVA having an average polymerization degree of 1,700, as measured by the viscosity method, and a saponification degree of 99.9% by mol., was subjected to controlled humidity such that it had a water content of 52%, and was melted and liquefied in a screw extruder having a barrel temperature of 140° C. The PVA material was then extruded from a round nozzle having a hole diameter of 3.0 mm into the air at 95° C. in order to completely dry the extruded PVA thread. The resulting threads were subjected 11 times to dry thermal drawing in a drawing furnace of the hot air type at 233° C., and then subjected to a shrinkage treatment of 10% at a temperature of 235° C., to produce the fiber. The resulting fiber was cut into a length shown in Table 2 to obtain a reinforcing material. The results obtained are shown in Table 2.

Example 12

A PVA having an average polymerization degree of 1,700, as measured by the viscosity method, and a saponification degree of 99.9% by mol., was subjected to controlled humidity such that it had a water content of 52%, and was melted and liquefied in a screw extruder having a barrel temperature of 140° C. The PVA was then extruded from a round nozzle having a hole diameter of 4.0 mm into the air at 95° C. in order to completely dry the PVA threads. The resulting threads was subjected 12 times to dry thermal drawing in a drawing furnace of the hot air type at 235° C., and then subjected to a shrinkage treatment of 10% at a temperature of 238° C., so as to produce fiber. The resulting fiber was cut into a length shown in Table 2 to obtain a reinforcing material. The results obtained are shown in Table 2.

Example 13

A reinforcing material was obtained in the same manner as described in Example 11 except that the hole diameter of a round nozzle was changed from 3.0–4.0 mm. The results obtained are shown in Table 2.

Examples 14–16

Reinforcing materials were obtained in the same manner as described in Example 12 except that the shrinkage rate was changed to 15% in Example 14, and it was changed to 10% in Examples 15 and 16, and the resulting fiber was cut into the length shown in Table 2. The results are shown in Table 2.

Comparative Examples 6–8

Reinforcing materials were obtained in the same manner as described in Example 12 except that the shrinkage ratio was changed to 0% (Comparative Example 6), 20% (Comparative Example 7) and 30% (Comparative Example 8). Because the elongation and the flexing tenacity utilization factor in Comparative Example 6 were too low, and also because the relationship between the elongation and the flexing tenacity utilization factor is not within the suitable range in Comparative Examples 7 and 8, sufficient reinforcing effects could not be attained for the fibers fiber group a and fiber group b. In this case, as a result, the toughness of the molded article was poor. The results obtained are shown in Table 2.

Comparative Example 9

A reinforcing material was obtained in the same manner as described in Example 12 except that the drawing ratio was changed to 13 times, the temperature, at which the shrinkage treatment was conducted, was changed to 245° C., and the shrinkage ratio was changed to 15%. Because the flexing tenacity utilization factor was too low, sufficient reinforcing effects could not be attained for the fibers of fiber group a and fiber group b. In this case, as a result, the toughness of the formed article was poor. The results obtained are shown in Table 2.

Comparative Example 10

A reinforcing material was obtained in the same manner as described in Example 13 except that the drawing ratio was changed to 13 times, and the shrinkage ratio was changed to 15%. Because the elongation and the flexing tenacity utilization factor were not in the suitable ranges, sufficient reinforcing effects could not be attained for the fibers of fiber group a and fiber group b. In this case, as a result, the toughness of the formed articles was poor. The results obtained are shown in Table 2.

Comparative Examples 11 and 12

Reinforcing materials were obtained in the same manner as described in Example 12 except that the cut length was changed. Because the aspect ratio was too small in Comparative Example 11, the performance of the formed article was low. Because the aspect ratio was too large in Comparative Example 12, the dispensability of the fiber was lowered, and the performance of the shaped article prepared was low. The results obtain are shown in Table 2.

The reinforcing material of the invention exhibited the superior reinforcing effect in the fibers of fiber group a and the fiber group b, and shaped articles excellent in toughness were obtained. Among these, the shaped articles prepared in Examples 12–14 had excellent toughness. A shaped article having a high maximum flexing stress, but having a low toughness, brings about a problem which is that because the shaped article has a low energy absorption function, it is weak against an impact-type stress, and because the possible amount of demolded material is small, breakage of the fibers is likely to proceed abruptly. However, even when a stress is applied to a shaped article having a high toughness, it absorbs the stress and exhibits superior impact resistance.

The shaped articles obtained in Examples shown in Table 1 (particularly in Examples 1–5) have an extremely high fiber tenacity, and exhibit an excellent reinforcing effect in the fibers of both fiber group a and the fiber group b. Thus, the shaped articles have excellent seismic resistance, in that the reinforcing effect is maintained after the formation of the first crack, and have excellent performance. Particularly in Examples 2, 4 and 5, because the fiber breaking strength is high, a further excellent effect is exhibited.

TABLE 1

| | Constitution of reinforcing material | | | | | | | | Kneaded and formed article | | | | | |
| --- | --- | --- | --- | --- | --- | --- | --- | --- | --- | --- | --- | --- | --- | --- |
| | Fineness | Fiber length | AP value | Tenacity | Modulus of elasticity | Elongation | Flexing tenacity utilization | Releasing resistance | Toughness coefficient | A | B | C | C/A | Maximum flexural stress |
| Example 1 | 40 | 10 | 152 | 9.6 | 227 | 13.0 | 53 | 8 | 25.1 | 0.28 | 161 | 3.9 | 13.4 | 295 |
| Example 2 | 26 | 8 | 151 | 12.5 | 282 | 9.3 | 50 | 8 | 32.8 | 0.28 | 165 | 4.7 | 16.8 | 320 |
| Example 3 | 15 | 6 | 150 | 9.2 | 170 | 11.5 | 53 | 8 | 28.2 | 0.28 | 153 | 4.2 | 15.0 | 290 |
| Example 4 | 14 | 9 | 234 | 16.2 | 410 | 6.5 | 52 | 8 | 31.9 | 0.29 | 175 | 4.6 | 15.9 | 335 |
| Example 5 | 14 | 15 | 390 | 16.2 | 410 | 6.5 | 50 | 8 | 32.3 | 0.30 | 173 | 6.5 | 21.7 | 322 |
| Example 6 | 6 | 6 | 235 | 9.4 | 200 | 8.2 | 50 | 8 | 28.6 | 0.28 | 165 | 3.3 | 11.0 | 270 |
| Example 7 | 6 | 6 | 235 | 9.4 | 200 | 8.2 | 50 | 11 | 29.7 | 0.28 | 167 | 2.8 | 10.0 | 290 |
| Example 8 | 75 | 6 | 66 | 11.5 | 270 | 9.4 | 49 | 8 | 27.5 | 0.26 | 151 | 3.1 | 11.9 | 242 |
| Example 9 | 26 | 2 | 38 | 12.5 | 282 | 9.3 | 50 | 8 | 24.7 | 0.27 | 185 | 3.0 | 11.1 | 250 |
| Example 10 | 26 | 22 | 414 | 12.5 | 282 | 9.3 | 50 | 8 | 27.5 | 0.29 | 184 | 3.2 | 11.0 | 260 |
| Comparative Example 1 | 26 | 0.5 | 9 | 12.5 | 282 | 9.3 | 50 | 8 | 15.9 | 0.26 | 140 | 1.9 | 7.3 | 205 |
| Comparative Example 2 | 26 | 30 | 564 | 12.5 | 282 | 9.3 | 50 | 8 | 19.1 | 0.26 | 135 | 2.1 | 8.4 | 240 |
| Comparative Example 3 | 2 | 3 | 214 | 16.7 | 343 | 5.4 | 20 | impossible to measure | 11.9 | 0.27 | 129 | 1.5 | 5.6 | 193 |
| Comparative Example 4 | 18 | 6.5 | 148 | 14.3 | 261 | 5.3 | 34 | 8 | 19.9 | 0.29 | 144 | 2.0 | 6.9 | 263 |
| Comparative Example 5 | 34 | 9 | 148 | 10.4 | 394 | 4.6 | 31 | 8 | 18.5 | 0.28 | 170 | 2.2 | 9.3 | 270 |

TABLE 2

| | Fineness | Fiber length | AP value | Constitution of reinforcing material | | | Flexing tenacity utilization | Releasing resistance | Toughness coefficient of formed article |
| | | | | Tenacity | Modulus of elasticity | Elongation | | | |
|---|---|---|---|---|---|---|---|---|---|
| Example 11 | 200 | 12 | 81 | 8.5 | 250 | 7.2 | 49 | 7 | 38.4 |
| Example 12 | 4,592 | 30 | 42 | 6.7 | 210 | 8.4 | 46 | 7 | 46.8 |
| Example 13 | 1,010 | 20 | 61 | 7.5 | 235 | 7.3 | 48 | 7 | 45.5 |
| Example 14 | 4,800 | 30 | 41 | 7.0 | 189 | 11.4 | 50 | 7 | 47.0 |
| Example 15 | 4,010 | 20 | 30 | 6.7 | 215 | 8.8 | 45 | 7 | 41.5 |
| Example 16 | 4,010 | 80 | 121 | 6.7 | 215 | 8.8 | 45 | 7 | 43.0 |
| Comparative Example 6 | 4,124 | 30 | 44 | 6.8 | 269 | 4.3 | 10 | 7 | 28.0 |
| Comparative Example 7 | 5,137 | 30 | 40 | 6.1 | 164 | 14.2 | 51 | 7 | 35.7 |
| Comparative Example 8 | 5,848 | 30 | 37 | 5.7 | 146 | 22.8 | 52 | 7 | 30.7 |
| Comparative Example 9 | 4,370 | 30 | 44 | 6.7 | 235 | 7.3 | 28 | 7 | 27.4 |
| Comparative Example 10 | 980 | 20 | 61 | 8.0 | 240 | 5.5 | 18 | 7 | 23.1 |
| Comparative Example 11 | 4,592 | 4 | 7 | 6.7 | 210 | 8.4 | 46 | 7 | 21.6 |
| Comparative Example 12 | 4,592 | 550 | 778 | 6.7 | 210 | 8.4 | 46 | 7 | 12.5 |

The disclosures of priority Japanese Application No. 100746/1998 filed on Apr. 13, 1998 and priority Japanese Application No. 155707/1998 filed on Jun. 4, 1998 are hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein.

What is claimed as new and is desired to be secured by Letters Patent:

1. A reinforcing material for incorporation into a kneaded and shaped hydraulic material, comprising:
   a fiber having a fineness of 5 d or more, an aspect ratio of from 10–500, a breaking tenacity of 5 g/d or more, an elongation (A) of from 6–20%, a flexing tenacity utilization factor (B) of 35% or more, and (B)≧4(A).

2. The reinforcing material as claimed in claim 1, wherein said fiber is a polyvinyl alcohol based fiber.

3. The reinforcing material as claimed in claim 1, wherein said fiber has a fineness of from 300–6,000 d and an aspect ratio of from 35–100.

4. The reinforcing material as claimed in claim 3, wherein said fiber has a fineness of from 3,000–5,000 d and an aspect ratio of from 40–80.

5. The reinforcing material as claimed in claim 1, wherein said fiber has a fineness of from 5–100 d and an aspect ratio of from 20–500.

6. The reinforcing material as claimed in claim 5, wherein said fiber has a fineness of from 10–50 d and an aspect ratio of from 60–400.

7. The reinforcing material as claimed in claim 1, wherein said fiber has a tenacity of 9 g/d or more.

8. The reinforcing material as claimed in claim 1, wherein said fiber has a flexing tenacity utilization factor (B) of 40% or more.

9. The reinforcing material as claimed in claim 1, wherein said fiber has an elongation (A) of at least 7% but no more than 15%.

10. The reinforcing material as claimed in claim 1, wherein (B)≧4.5 (A).

11. An article prepared by three-dimensionally and uniformly dispersing by kneading fibers having a fineness of 5 d or more, an aspect ratio of from 10–500, a breaking tenacity of 5 g/d or more, an elongation (A) of from 6–20%, a flexing tenacity utilization factor (B) of 35% or more, and (B)≧4(A) in a hydraulic material and then shaping the kneaded fiber containing material, thereby preparing said article.

12. The article as claimed in claim 11, wherein said fiber is polyvinyl alcohol based fiber.

13. The article as claimed in claim 11, wherein said fiber has a fineness of from 300–6,000 d and an aspect ratio of from 35–100.

14. The article as claimed in claim 11, wherein said fiber has a fineness of from 5–100 d and an aspect ratio of from 20–500.

15. The reinforcing material as claimed in claim 11, wherein said fiber has a tenacity of 9 g/d or more.

16. The reinforcing material as claimed in claim 11, wherein said fiber has a flexing tenacity utilization factor (B) of 40% or more.

17. The reinforcing material as claimed in claim 11, wherein said fiber has an elongation (A) of at least 7% but no more than 15%.

18. The reinforcing material as claimed in claim 11, wherein (B)≧4.5(A).

* * * * *